(12) United States Patent
Howard et al.

(10) Patent No.: US 11,361,768 B2
(45) Date of Patent: Jun. 14, 2022

(54) UTTERANCE CLASSIFIER

(71) Applicant: Google LLC, Mountain View, CA (US)

(72) Inventors: Nathan David Howard, Mountain View, CA (US); Gabor Simko, Santa Clara, CA (US); Maria Carolina Parada San Martin, Boulder, CO (US); Ramkarthik Kalyanasundaram, Cupertino, CA (US); Guru Prakash Arumugam, Sunnyvale, CA (US); Srinivas Vasudevan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 93 days.

(21) Appl. No.: 16/935,112

(22) Filed: Jul. 21, 2020

(65) Prior Publication Data
US 2020/0349946 A1  Nov. 5, 2020

Related U.S. Application Data (63) Continuation of application No. 16/401,349, filed on May 2, 2019, which is a continuation of application
(Continued)

(51) Int. Cl.
*G10L 15/08* (2006.01)
*G10L 15/22* (2006.01)
(Continued)

(52) U.S. Cl.
CPC ............. *G10L 15/22* (2013.01); *G06F 3/167* (2013.01); *G10L 15/16* (2013.01); *G10L 15/18* (2013.01);
(Continued)

(58) Field of Classification Search
CPC ......... G10L 15/08; G10L 15/00; G10L 15/01; G10L 15/02; G10L 15/06; G10L 15/063;
(Continued)

(56) References Cited

U.S. PATENT DOCUMENTS

| | | |
|---|---|---|
| 6,795,808 B1 | 9/2004 | Strubbe et al. |
| 6,925,432 B2 | 8/2005 | Lee et al. |

(Continued)

FOREIGN PATENT DOCUMENTS

| | | |
|---|---|---|
| EP | 2950307 A1 | 12/2015 |
| KR | 10-2002-0080174 A | 10/2002 |

(Continued)

OTHER PUBLICATIONS

International Search Report and Written Opinion issued in International Application No. PCT/US2018/026723, dated Jun. 25, 2018, 13 pages.

(Continued)

*Primary Examiner* — Qi Han
(74) *Attorney, Agent, or Firm* — Honigman LLP; Brett A. Krueger; Grant Griffith (57) ABSTRACT

A method includes receiving a spoken utterance that includes a plurality of words, and generating, using a neural network-based utterance classifier comprising a stack of multiple Long-Short Term Memory (LSTM) layers, a respective textual representation for each word of the of the plurality of words of the spoken utterance. The neural network-based utterance classifier trained on negative training examples of spoken utterances not directed toward an automated assistant server. The method further including determining, using the respective textual representation generated for each word of the plurality of words of the spoken utterance, that the spoken utterance is one of directed toward the automated assistant server or not directed toward the (Continued)

automated assistant server, and when the spoken utterance is directed toward the automated assistant server, generating instructions that cause the automated assistant server to generate a response to the spoken utterance.

18 Claims, 4 Drawing Sheets

Related U.S. Application Data

No. 15/659,016, filed on Jul. 25, 2017, now Pat. No. 10,311,872.

(51) Int. Cl.
*G06F 3/16* (2006.01)
*G10L 15/16* (2006.01)
*G10L 15/18* (2013.01)
*G10L 15/30* (2013.01)
*G10L 17/00* (2013.01)

(52) U.S. Cl.
CPC .............. *G10L 15/30* (2013.01); *G10L 17/00* (2013.01); *G10L 2015/223* (2013.01); *G10L 2015/227* (2013.01)

(58) Field of Classification Search
CPC ..... G10L 15/083; G10L 15/16; G10L 15/183; G10L 15/187; G10L 15/20; G10L 15/22; G10L 15/26; G10L 15/28; G10L 15/30
USPC ....... 704/231, 232, 236, 245, 251, 254, 255, 704/270.1, 275
See application file for complete search history.

(56) References Cited

U.S. PATENT DOCUMENTS

| | | |
|---|---|---|
| 7,606,714 B2 | 10/2009 | Williams et al. |
| 9,984,682 B1 | 5/2018 | Tao et al. |
| 10,332,513 B1 | 6/2019 | D'Souza et al. |
| 2003/0167167 A1 | 9/2003 | Gong |
| 2008/0004881 A1 | 1/2008 | Attwater et al. |
| 2008/0269958 A1 | 10/2008 | Filev et al. |
| 2009/0006085 A1 | 1/2009 | Horvitz et al. |
| 2014/0249811 A1 | 9/2014 | Doherty et al. |
| 2015/0095026 A1 | 4/2015 | Bisani et al. |
| 2015/0340032 A1 | 11/2015 | Gruenstein |
| 2016/0099010 A1* | 4/2016 | Sainath ................ G06N 3/0445 704/232 |
| 2016/0248768 A1 | 8/2016 | McLaren et al. |
| 2017/0092278 A1 | 3/2017 | Evermann et al. |
| 2018/0090140 A1 | 3/2018 | Georges et al. |
| 2018/0102127 A1 | 4/2018 | Izawa et al. |
| 2019/0035390 A1 | 1/2019 | Howard et al. |

FOREIGN PATENT DOCUMENTS

| | | |
|---|---|---|
| KR | 10-2015-0104615 A | 9/2015 |
| KR | 10-2015-0138109 A | 12/2015 |

OTHER PUBLICATIONS

Korean Intellectual Property Office Action for the related Application No. 10-2020-7002950, dated Jun. 29, 2021, 93 pages.

* cited by examiner

UTTERANCE CLASSIFIER

CROSS-REFERENCE TO RELATED APPLICATION

This U.S. patent application is a continuation of, and claims priority under 35 U.S.C. § 120 from, U.S. patent application Ser. No. 16/401,349, filed on May 2, 2019, which is a continuation of U.S. patent application Ser. No. 15/659,016, filed on Jul. 25, 2017. The disclosures of these prior applications are considered part of the disclosure of this application and are hereby incorporated by reference in their entireties FIELD This specification relates generally to classification and more specifically to classification using neural networks.

BACKGROUND

A speech-enabled environment is one in which a user can speak a query or command aloud and a computer-based system will obtain the query, answer the query, and/or cause the command to be performed using speech recognition techniques. The speech-enabled environment may include a network of connected microphone devices distributed throughout the various rooms or areas of the environment. A user has the power to orally query the computer-based system from essentially anywhere in the speech-enabled environment without the need to have a computer or other device in front of him/her or even nearby. For example, while getting dressed in the morning, a user might ask the computer-based system "what's the temperature outside?" and, in response, receive an answer from the system, e.g., in the form of synthesized voice output. In other examples, a user might ask the computer-based system questions such as "what time does my favorite restaurant open?" or "where is the nearest gas station?".

SUMMARY

For the speech-enabled environment, users can interact with the computer-based system primarily through voice input. As a result, the computer-based system may obtain potentially all utterances and noises made in the speech-enabled environment including those utterances not directed towards the computer-based system. Thus, the computer-based system must have some way to discern between utterances directed towards the computer-based system and utterances not directed towards the computer-based system, but rather, to other individuals present in the speech-enabled environment. One way to accomplish this is for the user to use a predetermined word, such as a hotword or keyword, to signify the attention of the computer-based system. Additionally, the other individuals in the speech-enabled environment understand that the use of the predetermined word is only for the computer-based system. For example, a user may speak "OK computer," followed by a query, to ask the computer-based system a question. However, the user having to speak a predetermined word each time he or she asks the computer-based system a question disrupts the flow of normal conversation and imposes a cognitive burden on the user. In order to alleviate this cognitive burden, the computer-based system can keep the microphone open for any follow on questions the user may have after a user asks a first question using the predetermined word. The follow on questions would not require the use of the predetermined word. However, the computer-based system would still need to discern follow on questions directed towards the computer-based system and other utterances obtained not directed towards the computer-based system. Accordingly, if the computer-based system determines a follow on utterance looks like a question likely directed to the computer-based system, then the follow on utterance is accepted and processed. Otherwise, the computer-based system closes the microphone and waits for the next utterance from a user that includes the predetermined word.

In some implementations, the computer-based system allows free form conversations with the user once the computer-based system listens for follow on questions. The user no longer needs to use the predetermined hotword to communicate with the computer-based system. The computer-based system uses both the acoustic characteristics of the obtained utterance and recognized text of the obtained utterance to determine whether the follow on question is directed towards the computer-based system.

In some implementations, a classification system includes a classifier to discern content of human speech. Specifically, the content includes a determination that the audience for the human speech is likely directed towards the automated assistant server. The classification system includes a speech recognizer, a transcription representation generator, an acoustic feature generator, a concatenation module, and a classifier to perform this determination function. The speech recognizer can obtain utterance information spoken by a user and generate a transcription of the spoken utterance from the user. The acoustic feature generator can receive the utterance information spoken by the user and output speech unit representations, such as feature vectors that describe the audio characteristics of the received spoken utterance. The transcription representation generator can receive the transcription of the spoken utterance from the speech recognizer and output transcriptions including word embeddings. The concatenation module can receive the acoustic information and the word embeddings, concatenate the acoustic information and the word embeddings into a matrix representation, and provide the matrix representation to the classifier. The classifier provides an indication that the audience for the obtained utterance is likely directed towards the automated assistant server.

In some implementations, the classifier includes one or more neural network elements to process the spoken utterance. The classifier trains the neural network elements with examples of queries previously spoken by users not likely directed towards the automated assistant server. This type of training allows the classifier to detect these types of queries and additionally, provide an indication that the audience for the obtained queries is likely directed towards the automated assistant server.

In one general aspect, a method is performed by one or more computers of a classification system. The method includes: receiving audio data corresponding to an utterance; obtaining a transcription of the utterance, generating a representation of the audio data generating a representation of the transcription of the utterance; providing (i) the representation of the audio data and (ii) the representation of the transcription of the utterance to a classifier that, based on a given representation of audio data and a given representation of a transcription of an utterance, is trained to output an indication of whether the utterance associated with the given representation is likely directed to an automated assistant or is likely not directed to an automated assistant; receiving, from the classifier, an indication of whether the utterance corresponding to the received audio data is likely directed to the automated assistant or is likely not directed to the automated assistant; and selectively instructing the automated assistant based at least on the indication of whether the utterance corresponding to the received audio data is likely directed to the automated assistant or is likely not directed to the automated assistant.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, wherein providing (i) the representation of the audio data and (ii) the representation of the transcription of the utterance to the classifier, further comprises: generating an input representation of a concatenation between (i) the representation of the audio data and (ii) the representation of the utterance; and providing the concatenated input representation to the classifier.

In some implementations, the method further comprises generating the input representation of the concatenation between (i) the representation of the audio data and (ii) the representation of the transcription of the utterance, further comprises: generating one or more numeric vectors converted from one or more words recognized in the representation of the transcription of the utterance; and generating a matrix of numeric vectors comprising the one or more numeric vectors to provide to the classifier.

In some implementations, the method further comprises receiving, from a speech recognizer at a word-embedding model, recognizable text corresponding to the utterance; generating, at the word-embedding model, the transcription of the utterance from the recognizable text; and providing, from the word-embedding model, the transcription of the utterance to the classifier.

In some implementations, wherein the representation of the audio data comprises acoustic mel-frequency cepstral coefficients (MFCCs) values.

In some implementations, the method further comprising providing, by a max pooling layer of the word embedding model, the transcription of the utterance comprising embedding units; providing, by an acoustic neural network, the representation of the audio data comprising audio units; concatenating the embedding units and the audio units to a representation unit input; and providing the representational unit input as input to the classifier.

In some implementations, wherein selectively instructing the automated assistant further comprises, selectively instructing the automated assistant to process the utterance when the classifier provides the indication that the utterance corresponding to the received audio data is likely directed to the automated assistant; and selectively instructing the automated assistant to not process the utterance when the classifier provides the indication that the utterance corresponding to the received audio data is not likely directed to the automated assistant.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The specification describes a technique for performing speech classification to determine whether an obtained utterance is likely directed towards the computer-based system. The computer-based system does not require that the obtained utterance include a predetermined word, such as a hotword, to invoke the computer-based system's attention. Rather, the computer-based system's microphone remains open for any obtained utterance of follow on questions following a user's first query that does include the predetermined word. Advantageously, the technique uses neural networks for both the acoustic characteristics and the recognized text of the obtained utterance to train a neural network to produce an indication of whether the audience for the obtained utterance is likely directed towards the computer-based system. This may be beneficial because users can converse in a more fluent manner with the computer-based system without the use of the hotword.

Figure 1:
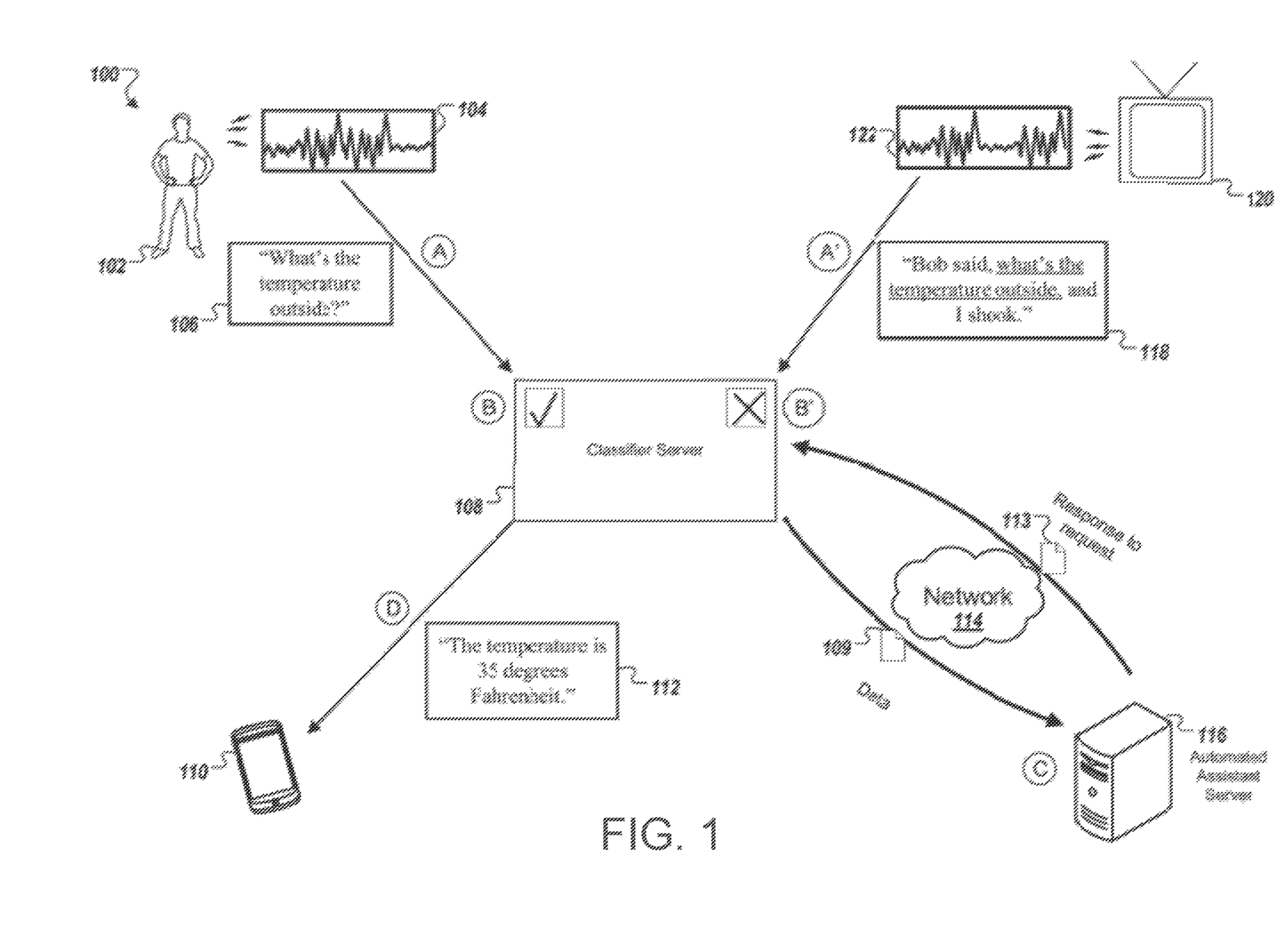
FIG. 1 is a block diagram that illustrates an example of a system for speech classification using a classifier.

FIG. 1 is a block diagram that illustrates an example of a system 100 for speech classification using a classifier server 108. The system 100 includes a classifier server 108 and an automated assistant server 116. Each of the classifier server 108 and the automated assistant server 116 can include one or more computers. The classifier server 108 includes one or more neural network components, a speech recognizer, and an acoustic feature generator, which will be further explained below with respect to FIG. 2. The classifier server 108 may include one or more servers connected locally or over a network. The classifier server 108 may be implemented in software, hardware, firmware, or a combination thereof. FIG. 1 illustrates various operations in stages (A) to (D) and (A') to (B') which can be performed in the sequence indicated or in another sequence.

The example of FIG. 1 shows an example of the classifier server 108 determining whether an utterance is likely directed towards a recipient. The processing shown in FIG. 1 achieves two important tasks. First, unlike systems that require a user to speak a hotword or keyword each time the user speaks to that system, the classifier server 108 does not require the utterance to include a hotword or a keyword after a first use of the hotword or keyword that signifies the audience is likely directed towards the automated assistant server 116. The classifier server 108 requires a user to include a word, such as a hotword or keyword, the first time a user 102 speaks to the automated assistant server 116. The classifier server 108 includes a microphone that turns on in response to hearing the hotword or keyword. Additionally, the microphone remains on for subsequent questions provided by the user 102. The microphone turns off once the user 102 ceases asking questions.

In conversational settings, when a user includes a hotword or a keyword each time he or she signifies to a device, such as the classifier server 108, the hotword can interrupt the flow of normal conversation. Therefore, the processing shown in FIG. 1 removes the use of a hotword or a keyword after a first use of the hotword or keyword to allow for conversation that is more fluent.

Second, the classifier server 108 can determine the audience that the utterance is likely directed to is the automated assistant server 116 without the use of a hotword. As a result, the classifier server 108 can distinguish between utterances directed towards the automated assistant server 116 and utterances not directed towards the automated assistant server 116. In some implementations, the utterances not directed towards the automated assistant server 116 may include phrases potentially directed towards the automated assistant server 116. For example, phrases such as "What time is it" may be included in phrases such as "Hey mom, I'm late for school, what time is it" that the classifier server 108 may obtain.

However, upon analyzing the recorded utterance, the classifier server 108 can determine that the utterance includes other phrases in connection with the question and indicates the audience for the utterance is not the automated assistant server 116. In summary, the classifier server 108 can judge the likelihood and provide an indication that the audience for the obtained utterance is likely directed to the automated assistant server 116.

In some implementations, the classifier server 108 can provide data indicating an obtained utterance and instructions to the automated assistant server 116. The classifier server 108 creates instructions to convey to the automated assistant server 116 whether to process the obtained utterance or not. For example, the classifier server 108 may obtain an utterance spoken by a user, such as user 102, and determine that the audience for the obtained utterance is likely directed to the automated assistant server 116. In response, the classifier server 108 can provide data, indicating instructions and the obtained utterance, to the automated assistant server 116 over a network such as network 114. The instructions request that the automated assistant server 116 process the obtained utterance and generate a response to the obtained utterance.

In some implementations, the automated assistant server 116 can generate a response to the obtained utterance. In particular, the automated assistant server 116 can provide an answer to the questions and/or statements provided by the classifier server 108. For example, the automated assistant server 116 may obtain data indicating an utterance and instructions that require the automated assistant server 116 to process the utterance. The automated assistant server 116 determines that the utterance recites, "What time is it" and generates a response to the utterance. For example, the automated assistance server 116 determines the time is "6:02 PM" and generates a response 113 to provide to the classifier server 108 over a network 114. The response 113 may include the answer that recites, "The time is 6:02 PM." The classifier server 108 can provide the response generated by the automated assistant server 116 to a client device, such as client device 110, owned by the user 102.

The examples of this system described above can be illustrated with regards to an exemplary use case shown in FIG. 1 as described below.

During stage (A), the classifier server 108 obtains a spoken utterance from a user 102. The spoken utterance can include various types of phrases and/or question directed towards the automated assistant server 116. In other implementations, the classifier server 108 can obtain one or more spoken utterances from the user 102 that is not likely directed to the automated assistant server 116. The spoken utterances may include audio waveform over a predetermined length of time.

In some implementations, the classifier server 108 may record utterances detected above a threshold level of volume. The levels of volume can be measured in decibels (dB). For example, the classifier server 108 may obtain audio recordings starting from a first time the classifier server 108 detects acoustical properties from users and/or devices nearby above a threshold to a second time when then the classifier server 108 no longer detects acoustical properties from the nearby users and/or devices. For example, the normal voice of a user in a typical area may vary between 42 dB and 80 dB, depending on the distance between the user and the classifier server 108. At the lower end of the volume level, for example, the classifier server 108 may be recording faint background noise. At the higher end of the volume level, for example, the classifier server 108 may be recording loud music or loud talking, to name a few examples. In one example, user 102 may pose a question to the automated assistant server 116, such as "Ok computer, what should I wear today?" at 2:15 PM. The classifier server 108 can detect the hotword from acoustical properties of the spoken question and process the question "what should I wear today?" Then, the classifier server 108's microphone remains on from 2:15 PM for a period of time to wait for follow on questions from user 102. The time period can be 5 second, 10 seconds, or 15 seconds, to name a few examples. The microphone remains on for as long as the user 102 continues to ask follow on questions directed towards the automated assistant server 116.

In some implementations, the classifier server 108 may record each audio utterances from various devices and/or users located near the location of the classifier server 108 above a particular threshold level. For example, the classifier server 108 may listen and record audio from users in the same room as the classifier server 108. In one example, the classifier server 108 may listen and record one or more individuals communicating from a television program as displayed by the television. In another example, the classifier server 108 may listen and record music played from speakers in audible range of the classifier server 108. In another example, the classifier server 108 may listen and record one or more individuals communicating over a client device, such as a cell phone or a laptop using a voice-to-talk or video chatting application. In particular, the audio recordings may be recorded from various devices and/or users located throughout a room where the classifier server 108 is located.

In the illustrated example, the classifier server 108 obtains an utterance 104 from user 102. The utterance 104 poses a question 106 to the automated assistant server 116. The question 106 recites, "What's the temperature outside?" The classifier server 108 obtains the utterance 104 and records the utterance 104 for further processing.

In some implementations, the user 102 may ask more than one question to the automated assistant server 116 in a short period. In other implementations, the user 102 may ask one question directed towards another individual in the area and a subsequent question directed towards the automated assistant server 116. For example, the user 102 may ask the question to his or her significant other "What should I wear today, Rachel?" and subsequently ask another question to the automated assistant server 116—"What is the temperature outside?" in this example, the classifier server 108 can record both questions asked by user 102 and determine following processing of the recorded utterances that the former question is not directed towards the automated assistant server 116 whereas the latter question is.

During stage (B), the classifier server 108 performs processing on the recorded utterance 104. In particular, the classifier server 108 classifies the recorded utterance 104 and provides an output indicating a likelihood that the audience for the utterance is likely directed to the automated assistant server 116. As further described below with respect to FIG. 2, the classifier server 108 utilizes an acoustic representation and a textual representation of the utterance 104 to determine whether the audience for utterance 104 is likely directed to the automated assistant server 116.

Figure 2:
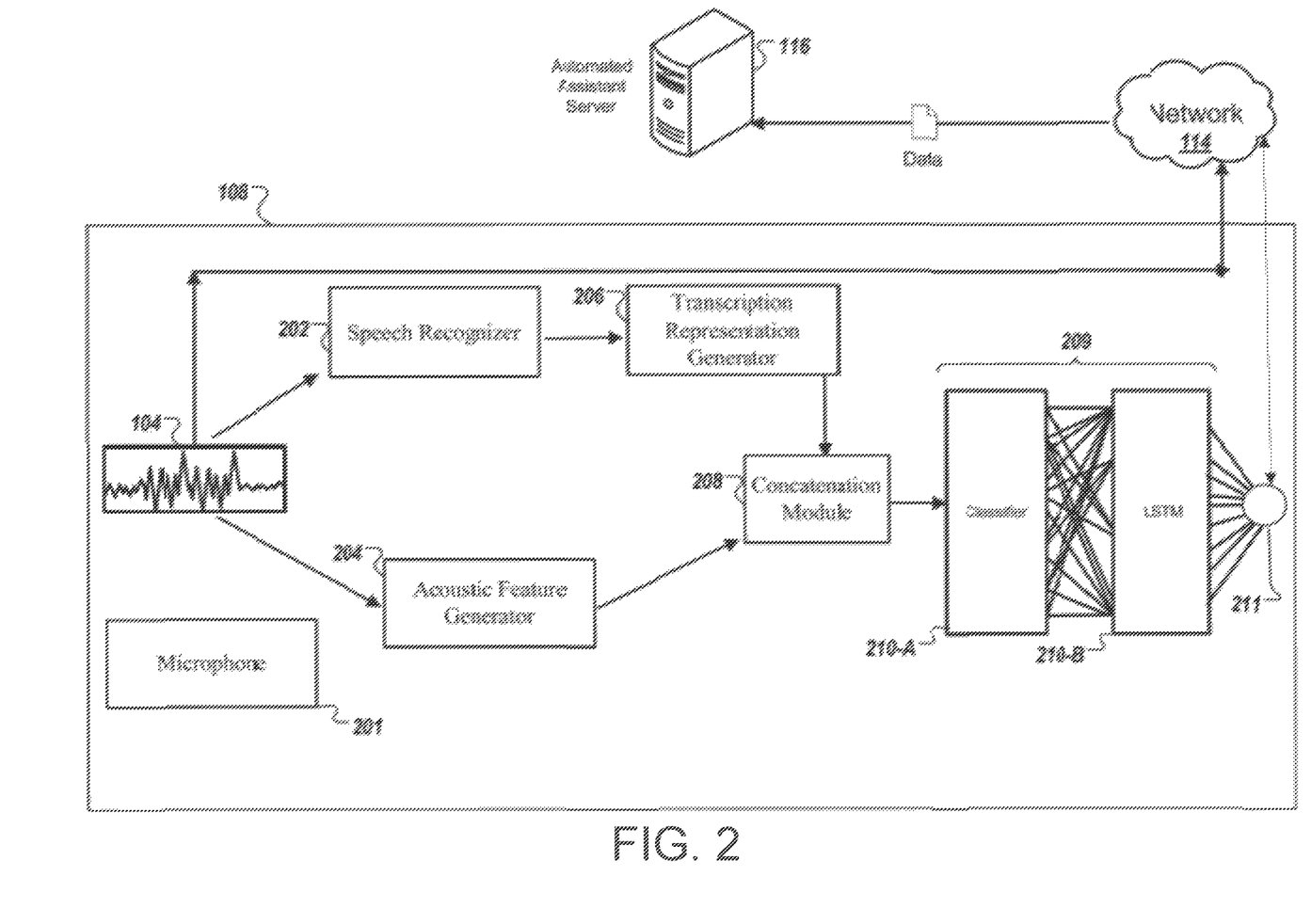
FIG. 2 is a block diagram that illustrates an example of a classification system.

In this illustrated example, the classifier server 108 produces an indication that the audience for the utterance 104 is likely directed to the automated assistant server 116. As seen in FIG. 2, the checkbox illustrates the indication. In a practical application, the automated assistant server 116 may provide an indication, such as a flashing light, upon a determination by the classifier server 108 that the audience for utterance 104 is likely directed to the automated assistant server 116. In some implementations, the automated assistant server 116 may provide the indication in response to receiving the selective instructions 109 from the classifier server 108. In other implementations, the automated assistant server 116 may provide a beep, a ring, or a predetermined tone as indicated by user 102 to denote the audience for the utterance 104 from user 102 is likely directed towards the automated assistant server 116.

In alternate implementations, the classifier server 108 may obtain utterances and determine that the obtained utterances are not likely directed towards the automated assistant server 116. This can be illustrated in the example shown in FIG. 1.

During stage (A') the classifier server 108 obtains another spoken utterance 122 from one or more devices. In this illustrated example, the television program from television 120 produces a spoken utterance 122 of a phrase 118 that includes the question 106. For example, a character in the television program may recite, "Bob said, what's the temperature outside, and I shook." In response, the classifier server 108 may obtain and record the spoken utterance 122 upon a determination that a volume of the utterance is above a decibel threshold level.

In some implementations, the classifier server 108 may obtain and record utterances, such as utterance 104 and utterance 122, at substantially the same time. The classifier server 108 can distinguish between each of the recorded utterances. In other implementations, the classifier server 108 may obtain and record utterances, such as utterance 104 and utterance 122, sequentially. In such a case where the classifier server 108 obtains utterances sequentially, the classifier server 108 processes each utterance in the order received. In other implementations, the classifier server 108 may produce an indication that the obtained and recorded utterance is not discernable. For example, the obtained and recorded utterance 104 may include various noise components, from external events such as other users speaking, the television's loud volume, a fan running in the background, and a dog barking, to name a few examples. The classifier server 108 may provide an indication such as "Please repeat the phrase," over a speaker to the user 102.

During stage (B'), the classifier server 108 performs processing on the recorded utterance 122. In particular, the classifier server 108 classifies the recorded utterance 122 and provides an output indicating a likelihood that the audience for utterance 122 was likely directed to the automated assistant server 116. In this illustrated example, the classifier server 108 provides an indication that the audience for the recorded utterance 122 was not likely directed to the automated assistant server 116. As seen in FIG. 2, the "X" in the box provides the indication as shown inside the classifier server 108. In a practical application, the classifier server 108 turns off a microphone to stop listening to conversation in response to the determination that the recorded utterance 122 was not likely directed to the automated assistant server 116.

In other implementations, the classifier server 108 may perform additional actions in response to the determination that the audience for the recorded utterance was not likely directed to the automated assistant server 116. For example, the classifier server 108 may discard the recorded utterance, such as recorded utterance 122, and continue listening for other utterances. In another example, the classifier server 108 may transfer the recorded utterance, such as recorded utterance 122, to the automated assistant server 116 with particular instructions.

In some implementations, instead of the classifier server 108 instructing the automated assistant server 116 to process the recorded utterance 122, the classifier server 108 may instruct the automated assistant server 116 to store the utterance in a database. The database may store one or more utterances that the classifier server 108 can access to determine whether a current obtained utterance does not match any of the stored utterances. For example, the classifier server 108 can compare the obtained utterance 104 to one or more utterances stored in the database. Should any of the comparisons match within a predetermined threshold, the classifier server 108 can reject that particular utterance since the audience was not likely directed to the automated assistant server 116. Alternatively, should none of the comparisons match, the classifier server 108 can process the recorded utterance through a classifier as described below with respect to FIG. 2.

During stage (C), the automated assistant server 116 obtains the data indicating the recorded utterance and the selective instructions from the classifier server 108. In the illustrated example, the automated assistant server 116 obtains the recorded utterance 104 and not the recorded utterance 122, because the classifier server 108 determined the audience for the former utterance is likely directed to the automated assistant server 116, whereas the audience for the latter utterance is not likely directed to the automated assistant server 116. The classifier server 108 does not provide an indication of who the likely recipient was of the recorded utterance 104, but rather, that the recipient was not likely directed towards the automated assistant server 116.

In some implementations, the automated assistant server 116 processes the recorded utterance, such as utterance 104, in response to the instructions in the data 109. For example, the instructions may convey to the automated assistant server 116 to process the recorded utterance 104 and provide a response to user 102's question 106. The automated assistant server 116 can use network access to the internet to search for and obtain an answer to the user 102's question 106. Continuing with the illustrated example in FIG. 1, the automated assistant server 116 can obtain an answer to the question 106—"What's the temperature outside?".

In some implementations, the automated assistant server 116 can use information associated with the classifier server 108 to assist in answering the question. For example, the automated assistant server 116 may obtain locational coordinates, a time, and a model type of the classifier server 108 to help with answering the question 106. By knowing the location of the classifier server 108 and the time, the automated assistant server 116 can obtain an answer of "35 degrees Fahrenheit" from the Internet or other databases.

In some implementations, the automated assistant server 116 generates a response 113 that includes the answer to the user 102's question 106. For example, the response includes the answer to the user 102's question in a sentence-structured format. The response 113 may include the statement 112 that recites, "The temperature is 35 degrees Fahrenheit." In some implementations, the statement 12 may be in a text form or an audio form. The automated assistant server 116 transmits the response 113 to the classifier server 108 over the network 114.

During stage (D), the classifier server 108 obtains the response 113 from the automated assistant server 116. The classifier server 108 may obtain the response 113 over the network 114. In response to obtaining the response 113, the classifier server 108 determines which client device to send the statement 112. The classifier server 108 analyzes a list of one or more client devices connected to the classifier server 108. In some implementations, a client device, such as client device 110, may connect to the classifier server 108 via a short-range communication protocol, such as Bluetooth or Wi-Fi. In some implementations, the classifier server 108 may send the statement 112 to each of the connected devices.

In some implementations, the classifier server 108 may transmit the statement 112 to the client device 110 associated with a user, such as user 102. For example, the classifier server 108 may determine from the obtained recorded utterance 104 that the speaker is user 102. The classifier server 108 may store an audio representation of a user, such as user 102, in a profile each time a new user speaks an utterance likely directed towards the automated assistant server 116. This may be beneficial and improve delay in responding to a user's utterance because the classifier 108 can receive an utterance and determine which user is speaking. If an utterance is received does not have a corresponding utterance associated with a user profile, the classifier server 108 creates a new user profile and stores the newly obtained utterance with the new user profile in memory.

In some implementations, the classifier server 108 may send a message, such as a text message, an email, and a short message service (SMS) message, to name a few examples, to the client device 110 with the statement 112. In other implementations, the classifier server 108 may play the statement 112 out of a speaker connected to the classifier server 108.

The operations of stages (A) to (D) and (A') to (B') illustrate one or more iterations of using the classifier server 108 to determine an audience the obtained utterance is likely directed towards. The classifier server 108 can repeat the operations of stages (A) to (D) and (A') to (B') for many other iterations. In some implementations, the classifier server 108 may perform the operations illustrated in FIG. 1 simultaneously. Additionally, the classifier server 108 may determine the operations illustrated in FIG. 1 for more utterances than just two utterances at a time, such as utterance 104 and utterance 122. FIG. 1 illustrates two utterances for exemplary purposes only.

FIG. 2 is a block diagram that illustrates an example of a classification system. In particular, FIG. 2 illustrates examples of the classifier server 108 of the system 100 discussed above. In some implementations, the classifier server 108 includes a microphone 201 for recording the obtained utterances, a speech recognizer 202, an acoustic feature generator, a transcription representation generator, a concatenation module 208, a neural network 209, and a sigma 211. As described in FIG. 1, the classifier server 108 obtains a recorded utterance 104 from a user 102. In some implementations, classifier server 108 propagates the recorded utterance 104 through the speech recognizer 202, the acoustic feature generator 204, the transcription representation generator 206, the concatenation module 208, the neural network 209, and the sigma 211 to judge a likelihood that the audience for the obtained utterance 104 is likely directed towards the automated assistant server 116.

The speech recognizer 202 may be a device including a combination of hardware, software, and firmware configured to identify words and phrases in a spoken language. In some implementations, the speech recognizer 202 converts the obtained utterance 104 to a machine-readable format. The machine-readable format may include one or more words in a sentence-structured format that represents the obtained utterance 104. In some implementations, the speech recognizer 202 may use various combinations of methodologies to perform speech recognition. For example, the speech recognizer 202 may include a Hidden Markov model approach, dynamic time warping (DTW)-based, neural networks, a deep feedforward and recurrent neural network approach, or some combination of the various approaches. The classifier server 108 provides the output of the speech recognizer 202 to a transcription representation generator 206. Simultaneously, the classifier server 108 provides the obtained utterance 104 to an acoustic feature generator 204.

In some implementations, the acoustic feature generator 204 may be a device including a combination of hardware, software, and firmware configured to extract feature vectors from the obtained utterance 104 and provide the extracted feature vectors as input to the recurrent neural network elements. The acoustic feature generator 204 analyzes different segments or analysis windows of the obtained utterance 104. These windows can be $w_0, \ldots w_n$, are referred to as frames of the audio. In some implementations, each window or frame represents the same fixed-size amount of audio, e.g., five milliseconds (ms) of audio. The windows may partially overlap or may not overlap. For the obtained utterance 104, a first frame $w_0$ may represent the segment from 0 ms to 5 ms, a second window $w_1$ may represent a segment from 5 ms to 10 ms, and so on.

In some implementations, a feature vector, or a set of acoustic feature vectors, may be determined for each frame of the obtained utterance 104. For example, the acoustic feature generator can perform a Fast Fourier Transform (FFT) on the audio in each window $w_0, \ldots w_n$; map the powers of the spectrum using a mel-frequency scale; take the logarithms of the powers at each mel-frequency, take the discrete cosine transform of the list of mel log powers; and, analyze the amplitude content of the features to determine the acoustic features for each window. The acoustic features may be mel-frequency cepstral coefficients (MFCCs), the features determined using a perceptual linear prediction (PLP) transform, or features determined using other techniques.

The classifier server 108 provides the feature vectors one at a time to the recurrent neural network elements in the acoustic feature generator 204. The recurrent neural network elements can be one or more long short-term memory (LSTM) layers. The acoustic feature generator 204 may be a deep-layered LSTM neural network architecture built by stacking multiple LSTM layers. The classifier server 108 can train the neural network in the acoustic feature generator 204 to provide an output of a fixed-size speech unit representation or an embedding. For example, the embedding may be a 64-unit vector. In some implementations, the units may be bits or bytes. One embedding is output for each feature vector.

In some implementations, the classifier server 108 includes the acoustic feature generator 204 along with the speech recognizer 202 to enhance the recognition of the context of the obtained utterance 104. In the illustrated example from FIG. 1, after the classifier server 108 classifies the question 106 and the user 102 does not ask a follow on question, sometimes the classifier server 108 records future utterances that may contain faint background noise or speech incorrectly recognized by the speech recognition system. For example, without the use of the acoustic feature generator 204, the classifier server 108 may transcribe the misrecognitions to common phrases, such as "Stop" or "Play."

Additionally, without the acoustic feature generator 204, the recognized text becomes insufficiently discriminative when the classifier server 108 classifies these utterances. By enabling an acoustic feature generator 204 in the classifier server 108, the classifier server 108 can reduce the failure cases of misrecognitions. In addition, people's utterances include distinctive acoustic elements not captured by the text of the utterance. For example, acoustic elements may include characteristics such as pitch, speech tempo, and accent, to name a few. By including the acoustic feature generator 204, the distinctive acoustic elements can assist in determining whether the audience for the utterance is likely directed towards the automated assistant server 116.

The transcription representation generator 206 can include one or more neural network layers. For example, the transcription representation generator 206 can include a convolutional neural network (CNN) word-embedding model. Like the acoustic feature generator 204, the transcription representation generator 206 can include one or more LSTM layers and may be a deep LSTM neural network architecture build by stacking multiple LSTM layers. In addition, the classifier server 108 trains the neural network in the transcription representation generator 206 to provide output of a transcription of the obtained utterance 104. In some implementations, the transcription of the utterance includes fixed-size text unit representations or embeddings. For example, each embedding output can be a 100-unit vector. In some implementations, the units may be floating point or integer values. One embedding output from the transcription representation generator 206 for each word of the sentence. The transcription includes each of the embedding units provided as output.

In some implementations, the classifier server 108 provides input that includes the sentence produced by the speech recognizer 202 to the transcription representation generator 206. The classifier server 108 inputs one word at a time from the sentence into the CNN word-embedding model of the transcription representation generator 206. In addition, the CNN word-embedding model may max pool the sentence data provided to the CNN word-embedding model to decrease the input data in order to reduce the computational complexity of the network. Max pooling allows for significant reduction in data throughput through the CNN word-embedding model by filtering and averaging the input data. This speeds up the process performed by the transcription representation generator 206 without suffering detail in output quality.

In order for the classifier server 108 to provide the maximum probability that the obtained utterance 104 is directed towards the automated assistant server 116, the classifier server 108 utilizes both outputs of the transcription representation generator 206 and the acoustic feature generator 204. The concatenation module 208 may be a device in software, hardware, firmware, or a combination of each that combines the embedding output from the transcription representation generator 206 and the embedding output from the acoustic feature generator 204. For example, the concatenation module 208 combines the 100-unit vector output from the transcription representation generator 206 and the 64-unit vector output from the acoustic feature generator 204 output to create a 164-unit vector output.

In some implementations, the concatenation module 208 may create a matrix of 164-unit vector outputs. For example, the matrix may include one or more columns of 164-unit vectors. This concatenation module 208 may convert the 100-unit embeddings to a semantically meaningful vector that include one or more numbers. The concatenation module 208 converts the 100-unit embeddings to the semantically meaningful vector that includes one or more numbers using one or more functional calls in a programming language, such as word2vec or GloVe.

In the illustrated example, the concatenation module 208 may generate a matrix of the numeric vectors from the transcription representation generator 208 and a matrix of embeddings from the acoustic feature generator 204. In particular, given a 10-word sentence where each word is associated with a 100-unit embedding, the concatenation module 208 may create a 10×100 matrix and concatenate that with the matrix from the acoustic feature generator 204. In the same example, the matrix from the acoustic feature generator 204 may include 10 feature vectors that each includes a 64-unit embedding. The concatenation module 208 may create a 10×64 matrix to concatenate with a 10×100 matrix from the transcription representation generator 206. The resultant matrix created by the concatenation module 208 may be 10×164.

The benefit of producing a matrix for the acoustic features of the utterance 104 and a matrix for the textual features of the utterance 104 is that the dimensions for each respective matrix is such that they can be combined into a proper matrix. For example, each matrix includes the same number of rows, which allow for a horizontal concatenation. Assuming the number of columns between respective matrices is similar, the concatenation module 208 would create a vertical concatenation. In some implementations, the concatenation module 208 provides the concatenated matrix to the neural network 209.

In some implementations, the concatenation module 208 may buffer the number of 164-unit vectors in the matrix until the neural network 209 has processed one 164-unit vector. Once the neural network 209 processes one 164-unit vector, the concatenation module 208 provides the next 164-unit vector into the neural network 209. The speech recognizer 202, the acoustic feature generator 204, the transcription representation generator 206, and the concatenation module 208 may create 164-unit vectors faster than the neural network 209 can process one 164-unit vector. Therefore, the concatenation module 208 creates a matrix buffer of 164-unit vectors to store and ready to be processed.

In some implementations, classifier server 108 includes a neural network 209 to process the concatenated matrix. In particular, the neural network 209 includes a classifier 210-A and another LSTM 210-B. The classifier server 108 can train the classifier 210-A and the LSTM 210-B to produce an output that indicates a likelihood that the audience for the obtained utterance 104 is likely directed towards the automated assistant server 116. In some implementations, the classifier 210-A and the LSTM 210-B are trained using examples of queries previously spoken by users and recorded dialog not directed towards the automated assistant server 116. For example, the classifier server 108 may retrieve multiple phrases spoken and in text format not directed towards the automated assistant server 116.

In some implementations, the classifier server 108 may retrieve other phrases from one or more databases across the internet that include phrases not directed towards the automated assistant server 116. For example, one of the phrases may include "Bob said, what's the temperature outside, and I shook" or "What time are your parents coming over?" Generally, the audience for these types of questions is another individual in the room, even though the classifier server 108 may interpret the audience to be likely directed towards the automated assistant server 116 for these types of questions. However, these types of questions are the optimal phrases to use for training the neural network 209. The classifier 210-A can learn to identify phrases that closely identify and seem to include an audience likely directed towards the automated assistant server 116, yet are actually background noises, or directed towards other individuals in a room. Such examples include, "What time are your parents coming over," "How much do you weigh," or "What did you buy at the grocery store?" Each of these questions do not include an identifier indicating who the speaker is talking to but do include a pronoun that may indicate to the classifier 210-A to look away when identifying phrases not directed towards the automated assistant server 116.

In some implementations, the classifier server 108 updates the weights of the classifier 210-A and the weights of the LSTM 210-B during training. For example, the classifier server 108 can update the weights of the classifier 210-A and the LSTM 210-B using back-propagation of errors through time with stochastic gradient descent.

In some implementations, the output of the classifier 210-A and the LSTM 210-B can include an indication that the audience for the obtained utterance 104 was likely directed towards the automated assistant server 116. For example, the indication may include a probability that the output of the 164-unit vector indicates the audience for the obtained utterance is likely directed towards the automated assistant server 116. In other implementations, the output of the classifier 210-A and the LSTM 210B collectively may include a score ranging from 0 to 100.

In some implementations, the sigma 211 sums each of the outputs provided by the LSTM 210-B. For example, the sigma 211 receives output probabilities or output scores for each of the 164-unit vectors for each utterance that propagates through the neural network 209. The sigma 211 cumulatively sums each output probability or score from the neural network 209 for the entire obtained utterance 104.

In some implementations, the sigma 211 compares the final output probability or score to a predetermined threshold. If the sigma 211 determines the final output probability or score exceeds the predetermined threshold, then the classifier server 208 indicates a likelihood that the audience for the obtained utterance 104 is likely directed towards the automated assistant server 116. Alternatively, the classifier server 108 indicates a likelihood that the audience for the obtained utterance 104 is likely directed towards the automated assistant server 114 if the final output probability or score is below the predetermined threshold. For example, the predetermined threshold may be a probability of 50% or a score of 50/100.

In some implementations, the classifier server 108 may determine from the output of the sigma 211 whether to provide the obtained utterance 104 to the automated assistant server 116. For example, should the classifier server 108 determine that the final output probability or score exceeds the predetermined threshold, the classifier server 108 generates instructions to provide to the automated assistant server 116. The instructions convey to the automated assistant server 16 to process the obtained utterance 104. The classifier server 108 packages the obtained utterance 104 and the generated instructions into data 109, and transmits the data 109 to the automated assistant server 116 for processing.

Alternatively, the classifier server 108 may determine the final output probability or score does not exceed the predetermined threshold. In response, the classifier server 108 may delete the obtained utterance 104 from memory and proceed to wait until a new obtained utterance. In other implementations, the classifier server 108 may generate instructions for the automated assistant server 116 indicating to not process the obtained utterance 104. In addition, the instructions may convey to the automated assistant server 116 to store the obtained utterance 104 in the database of stored utterances not directed towards the automated assistant server 116. The classifier server 108 packages the obtained utterance 104 and the generated instructions into data 109, and transmits the data to the automated assistant server 116 for processing.

Figure 3:
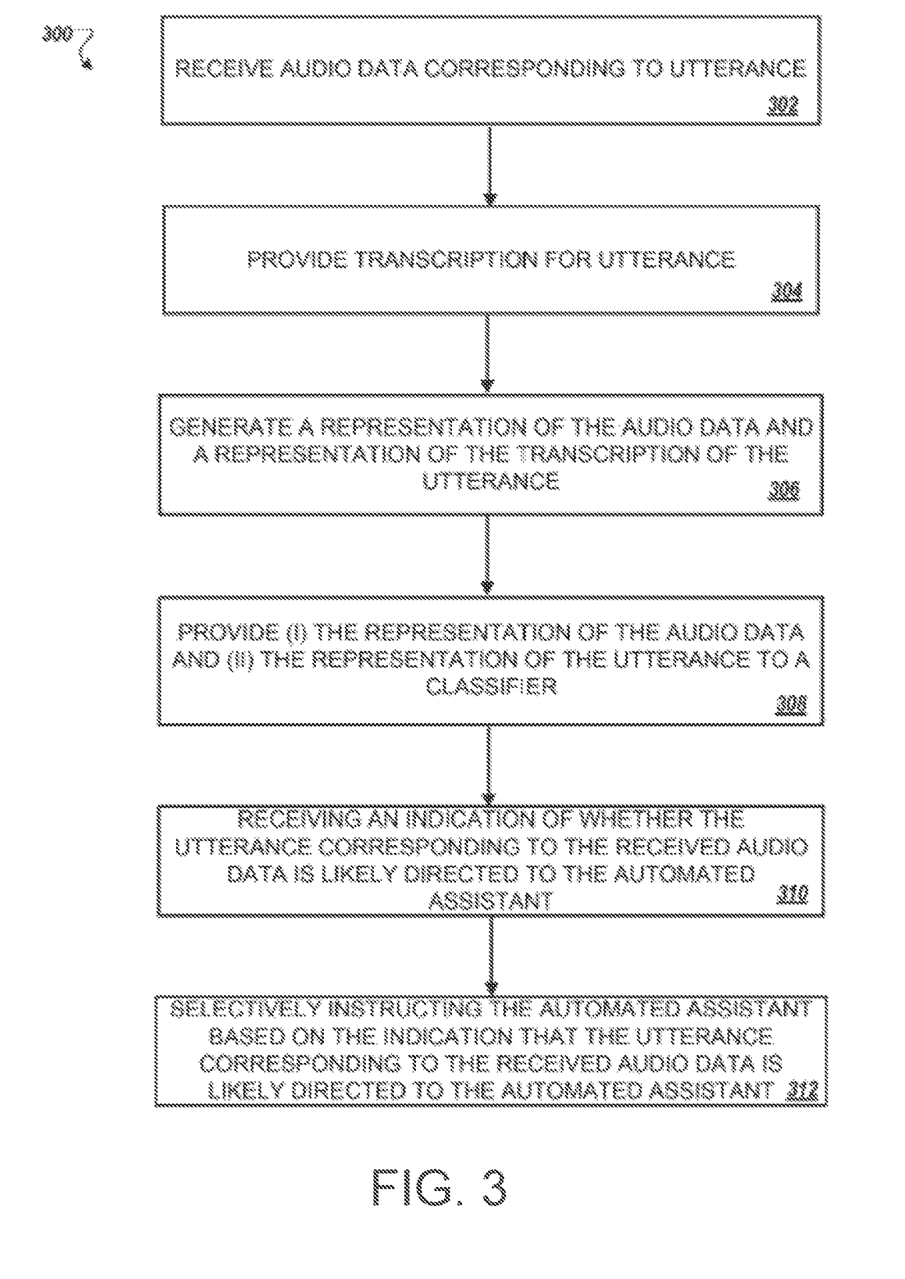
FIG. 3 is a flow diagram that illustrates an example of a process for speech classification.

FIG. 3 is a flow diagram that illustrates an example of a process 300 for speech classification. One or more computers, such as one or more computers of the classifier server 108, may perform the process 300.

In the process 300, the one or more computers receive audio data corresponding to an utterance (302). For example, the classifier server 108 obtains a spoken utterance from a user 102. The spoken utterance can include various types of phrase and/or questions directed towards the automated assistant server 116. In other implementations, the classifier server 108 can obtain one or more spoken utterances from the user 102 not directed towards the automated assistant server 116. In other implementations, the classifier server 108 may obtain audio utterances from various devices located near the classifier server 108. For example, the classifier server 108 may listen to and record one or more individuals communicating in a television program as displayed by the television. In another example, the classifier server 108 may listen and record music played from speakers in audible range of the classifier server 108.

The one or more computers provide transcription for an utterance (304). For example, the speech recognizer 202 included in the classifier server 108 converts the obtained utterance 104 to a machine-readable format. The machine-readable format may include one or more words in a structured format that represents the obtained utterance 104. The classifier server 108 provides input that includes the sentence produced by the speech recognizer 202 to the transcription representation generator 206.

The one or more computers generate a representation of the audio data and a representation of the transcription of the utterance (306). For example, the classifier server 108 includes an acoustic feature generator 204 configures to extract feature vectors from the obtained utterance 104 and provide the extracted feature vectors as input to the recurrent neural network elements in the acoustic feature generator 204. In particular, the classifier server 108 provides the extracted feature vectors one at a time to the recurrent neural network elements.

In some implementations, the classifier server 108 can train the recurrent neural network in the acoustic feature generator 204 to provide output of a fixed-size speech representation or an embedding. For example, the embedding may be a 64-unit vector. In some implementations, the units may be bits or bytes. One embedding is output for each feature vector.

In some implementations, the classifier server 108 inputs one word at a time from the sentence into a CNN word-embedding model of the transcription representation generator 206. The classifier server 108 can train the neural network in the transcription representation generator 206 to provide output of a transcription of the obtained utterance 104. The transcriptions of the utterance include fixed-size text unit representations or embeddings. For example, each embedding output can be a 100-unit vector. The transcription includes each of the embedding units provided as output.

The one or more computers provide (i) the representation of the audio data and (ii) the representation of the utterance to a classifier (308). For example, the concatenation module 208 converts each of the 100-unit embedding to a semantically meaning vector that includes one or more numbers. The concatenation modules 208 combines the embedding output of the transcription representation generator 206 and the embedding output from the acoustic feature generator 204. For example, the concatenation module 208 combines the 100-unit vector output from the transcription representation generator 206 and the 64-unit vector output from the acoustic feature generator 204 output to create a 164-unit vector output.

In some implementations, the concatenation module 208 may generate a matrix of the numeric vectors from the transcription representation generator 206 and a matrix of embeddings from the acoustic feature generator 204. In particular, given a 0-word sentence where each word is associated with a 100-unit embedding, the concatenation module 208 may create a 10×100 matrix and concatenate that with the matrix from the acoustic feature generator 204. In the same example, the matrix from the acoustic feature generator 204 may include 10 feature vectors that each includes a 64-unit embedding. The concatenation module 208 may create a 10×64 matrix to concatenate with a 10×100 matrix from the transcription representation generator 206. The resultant matrix created by the concatenation module 208 may be of size 10×164. In some implementations, the concatenation module 208 provides the concatenated matrix to the neural network 209, one 164-unit vector at a time.

The one or more computers receive an indication of whether the audience for the utterance is likely directed towards the automated assistant (310). For example, the classifier server 108 includes a neural network 209 to process the concatenated matrix. In particular, the neural network 209 includes a classifier 210-A and another LSTM 210-B. The classifier server 108 can train the classifier 210-A and the LSTM 210-B to produce an output that indicates the audience for the obtained utterance 104 is likely directed towards the automated assistant server 116. In some implementations, the classifier 210-A and the LSTM 210-B are trained using examples of queries previously spoken by users and recorded dialog not directed towards the automated assistant server 116.

In some implementations, the output of the classifier 210-A and the LSTM 210-B can include an indication that the audience for the obtained utterance is likely directed towards the automated assistant server 16. For example, the indication may include a probability of how likely audience for the output of the 164-unit vector is likely directed towards the automated assistant server 116. In other implementations, the output of the classifier 210-A and the LSTM 210B collectively may include a score ranging from 0 to 100.

The one or more computers selectively instruct the automated assistant based on the indication that the utterance corresponding to the received audio data is likely directed to the automated assistant (312). For example, the classifier server 108 includes a sigma 211 at the output of the neural network 109. The sigma 211 sums each of the outputs provided by the LSTM 210-B. For example, the sigma 211 receives output probabilities or output scores for each of the 164-unit vectors for each utterance that propagates through the neural network 209. The sigma 211 cumulatively sums each output probability or score from the neural network 209 until the sigma 211 entirely processes the obtained utterance 104.

In some implementations, the sigma 211 compares the final output probability or score to a predetermined threshold. If the sigma 211 determines the final output probability or score exceeds the predetermined threshold, then the classifier server 208 indicates a likelihood that the audience for the obtained utterance 104 is likely directed towards the automated assistant server 116. Alternatively, the classifier server 108 indicates a likelihood that the audience for the obtained utterance 104 is likely directed towards the automated assistant server 114 if the final output probability or score is below the predetermined threshold.

In some implementations, the classifier server 108 may determine from the output of the sigma 211 whether to provide the obtained utterance 104 to the automated assistant server 116. For example, should the classifier server 108 determine that the final output probability or score exceeds the predetermined threshold, the classifier server 108 generates instructions to provide to the automated assistant server 116. The instructions instruct the automated assistant server 116 to process the obtained utterance 104. The classifier server 108 packages the obtained utterance 104 and the generated instructions into data 109, and transmits the data 109 to the automated assistant server 116 for processing.

Alternatively, the classifier server 108 may determine the final output probability or score does not exceed the predetermined threshold. In response, the classifier server 108 may delete the obtained utterance 104 from memory and proceed to wait until the next obtained utterance.

Figure 4:
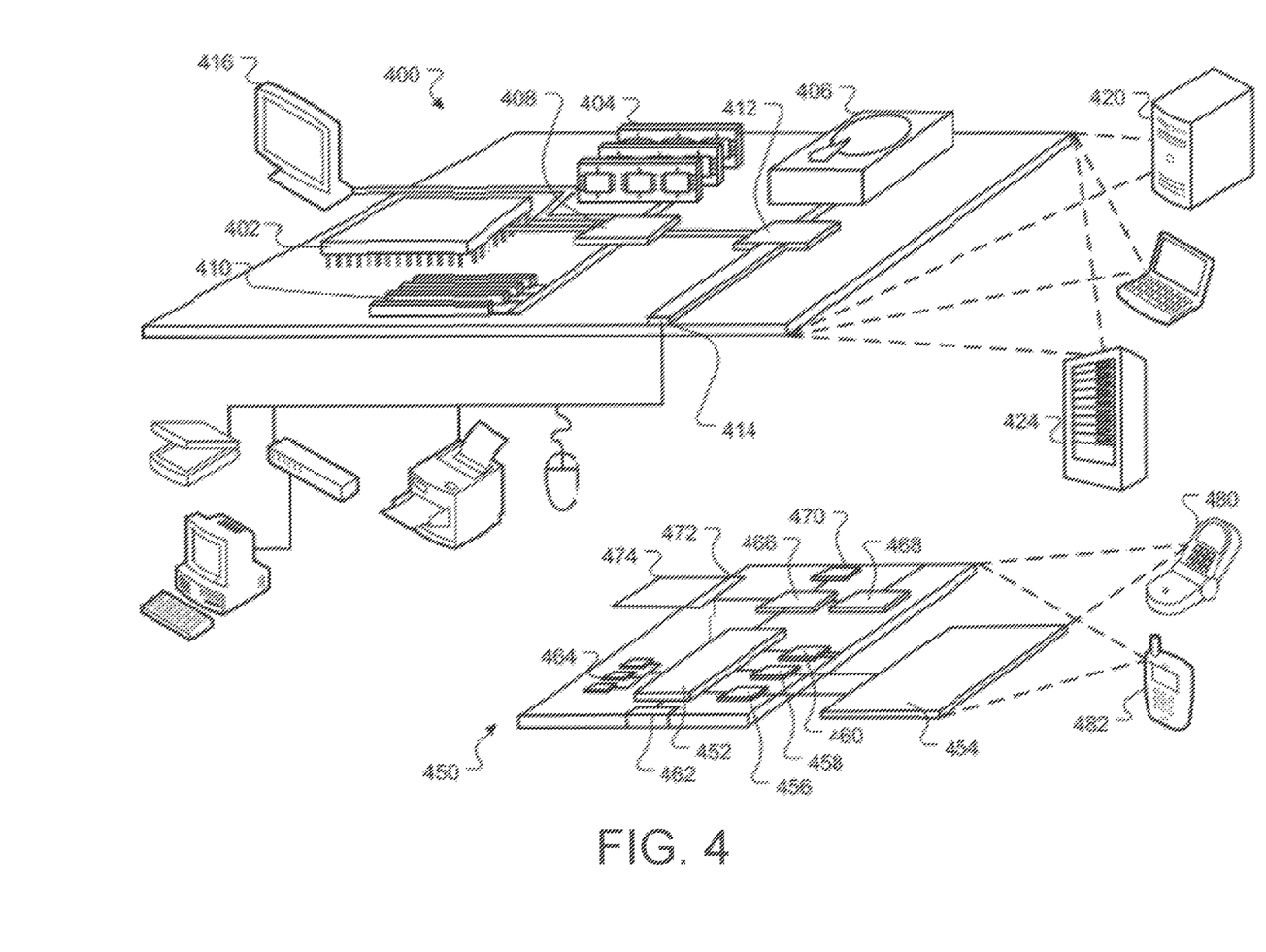
FIG. 4 shows an example of a computing device and a mobile computing device.

FIG. 4 shows an example of a computing device 400 and a mobile computing device 450 that can be used to implement the techniques described here.

The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLD (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single. In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, such that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, at data processing hardware, a spoken utterance captured by an automated assistant device associated with a user, the spoken utterance comprising a plurality of words;
generating, by the data processing hardware, using a neural network-based utterance classifier comprising a stack of multiple Long-Short Term Memory (LSTM) layers, a respective textual representation for each word of the of the plurality of words of the spoken utterance, the neural network-based utterance classifier trained on negative training examples of spoken utterances not directed toward an automated assistant server;
determining, by the data processing hardware, using the respective textual representation generated for each word of the plurality of words of the spoken utterance, that the spoken utterance is one of:
directed toward the automated assistant server; or
not directed toward the automated assistant server; and
when the spoken utterance is directed toward the automated assistant server:
generating, by the data processing hardware, instructions that cause the automated assistant server to generate a response to the spoken utterance; and
providing, by the data processing hardware, for output from the automated assistant device, an indication that an audience for the spoken utterance is directed toward the automated assistant server.

2. The method of claim 1, wherein the respective textual representation comprises a fixed-length vector.

3. The method of claim 2, wherein the fixed-length vector comprises a 100-unit vector.

4. The method of claim 1, wherein the automated assistant server generates the response to the spoken utterance by processing a transcription of the spoken utterance.

5. The method of claim 1, wherein the spoken utterance is captured by a microphone of the automated assistant device.

6. The method of claim 1, wherein the spoken utterance comprises an audio waveform.

7. The method of claim 1, wherein the indication comprises an audible tone.

8. The method of claim 1, wherein the indication comprises a flashing light.

9. The method of claim 1, further comprising, when the spoken utterance is not directed toward the automated assistant server, discarding, by the data processing hardware, the spoken utterance captured without generating the instructions that cause the automated assistant server generate the response to the spoken utterance.

10. A system comprising:
data processing hardware; and
memory hardware storing instructions that when executed on the data processing hardware cause the data processing hardware to perform operations comprising:
receiving a spoken utterance captured by an automated assistant device associated with a user, the spoken utterance comprising a plurality of words;
generating, using a neural network-based utterance classifier comprising a stack of multiple Long-Short Term Memory (LSTM) layers, a respective textual representation for each word of the of the plurality of words of the spoken utterance, the neural network-based utterance classifier trained on negative training examples of spoken utterances not directed toward an automated assistant server;
determining, using the respective textual representation generated for each word of the plurality of words of the spoken utterance, that the spoken utterance is one of:
directed toward the automated assistant server; or
not directed toward the automated assistant server; and
when the spoken utterance is directed toward the automated assistant server:
generating instructions that cause the automated assistant server to generate a response to the spoken utterance; and
providing, for output from the automated assistant device, an indication that an audience for the spoken utterance is directed toward the automated assistant server.

11. The system of claim 10, wherein the respective textual representation comprises a fixed-length vector.

12. The system of claim 11, wherein the fixed-length vector comprises a 100-unit vector.

13. The system of claim 10, wherein the automated assistant server generates the response to the spoken utterance by processing a transcription of the spoken utterance.

14. The system of claim 10, wherein the spoken utterance is captured by a microphone of the automated assistant device.

15. The system of claim 10, wherein the spoken utterance comprises an audio waveform.

16. The system of claim 10, wherein the indication comprises an audible tone.

17. The system of claim 10, wherein the indication comprises a flashing light.

18. The system of claim 10, wherein the operations further comprise, when the spoken utterance is not directed toward the automated assistant server, discarding the spoken utterance captured without generating the instructions that cause the automated assistant server generate the response to the spoken utterance.

* * * * *